United States Patent Office 2,816,814
Patented Dec. 17, 1957

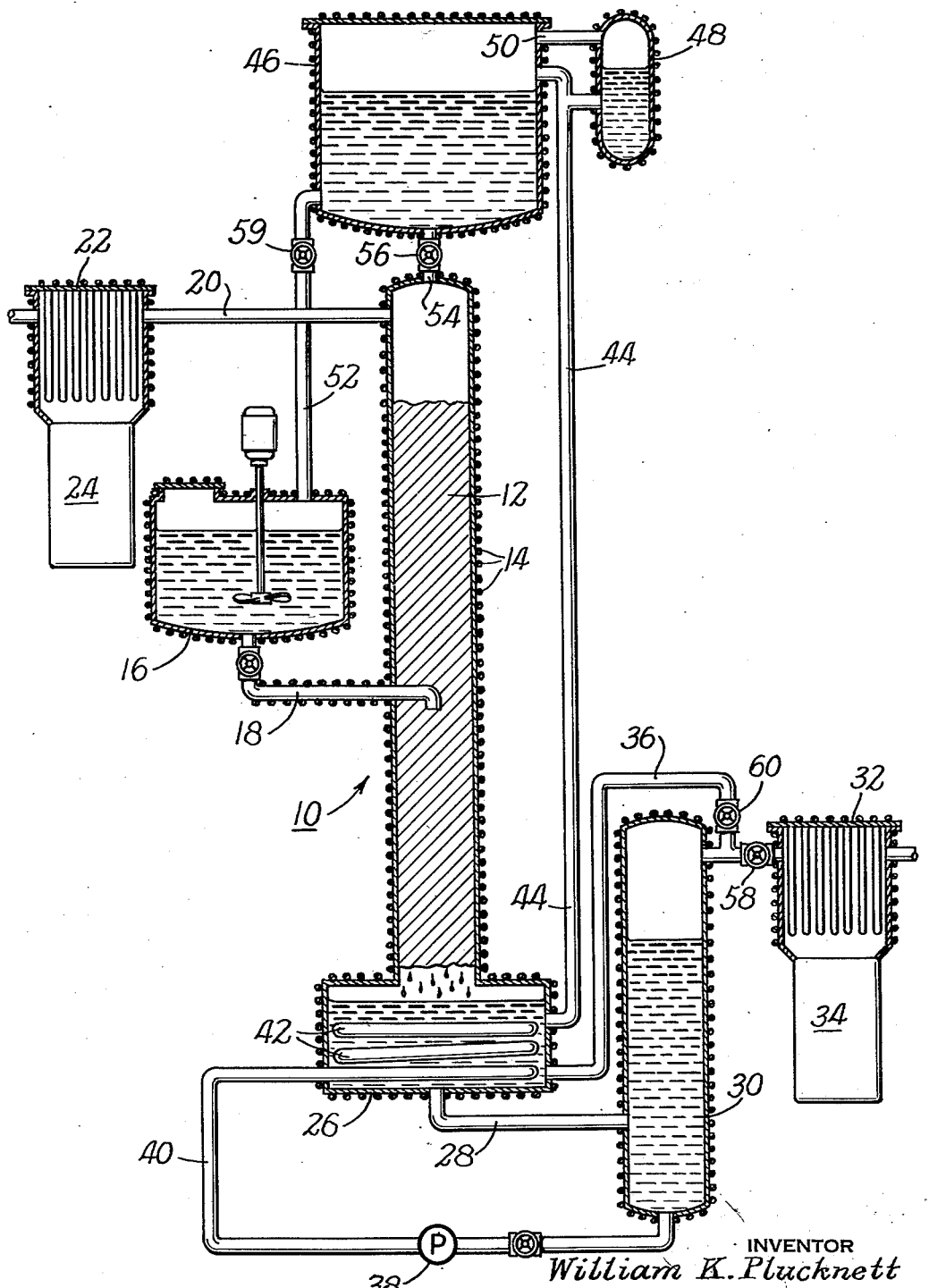

2,816,814
SEPARATION OF ZIRCONIUM AND HAFNIUM HALIDES

William K. Plucknett, Lexington, Ky.

Application August 20, 1953, Serial No. 375,512

3 Claims. (Cl. 23—17)

This invention is concerned with the purification by volatilization of sublimable metal salts with respect to difficultly removable impurities, and more particularly with a novel method for recovering substantially pure zirconium halides from mixtures of zirconium and hafnium halides.

Zirconium as it occurs naturally is normally associated with a small proportion of hafnium and because of the similarities in the chemical and physical properties of these two elements, the separation of the zirconium from the hafnium to obtain pure zirconium presents a considerable problem. Various methods have previously been proposed for separating zirconium and hafnium, but so far as I am aware all of these prior methods have been either ineffective or excessively time-consuming and expensive.

It is accordingly a principal object of the present invention to provide an improved method of separating zirconium and hafnium. It is another object of the invention to provide a relatively simple distillation method whereby zirconium and hafnium in the form of a halide mixture can be effectively separated. It is still another object of the invention to provide a method of separating zirconium and hafnium wherein a relatively large separation factor is achieved. Other objects of the invention will be in part obvious and in part pointed out hereafter.

In one of its broader aspects the method of the invention comprises dissolving a mixture of zirconium and hafnium halides in molten stannous chloride and fractionally distilling the resulting solution to effect at least a partial separation of the components of the mixture. While a mixture of the bromides or iodides can be used as a solute, economic considerations favor the use of the chlorides and the preferred solute is a mixture of zirconium and hafnium tetrachlorides. The distillation can be conveniently carried out in any of various known types of fractionating towers such as, for example a packed tower, provided that the material of which the tower is constructed is so selected as to meet the thermal and other requirements of the present process as outlined below. In general, the method is carried out by feeding to an intermediate point in the tower a solution of the mixture to be separated in a solvent which is molten stannous chloride. A further quantity of the molten solvent is continuously introduced at or near the top of the tower to provide a liquid reflux. The molten solvent acts as a liquid exchange medium for the ascending vapors of the mixture to be separated. The more volatile constituent of the mixture e. g. hafnium tetrachloride, is removed in vapor form at the top of the column and condensed. The less volatile constituent e. g. zirconium tetrachloride, leaves the column in solution in the solvent and is subsequently stripped therefrom, after which the solvent is recycled.

By using the process outlined above, an effective separation of the zirconium and hafnium halides can be achieved in a tower having a relatively small number of theoretical plates. It has been found that stannous chloride possesses a number of properties that appear to render it outstandingly useful as a solvent in the present process. Thus stannous chloride has a melting point that is below the temperature at which a mixture of zirconium and hafnium tetrachloride sublimes, whereas in general the other readily available low melting point salts and salt mixtures have melting points above the subliming temperature of the tetrachloride. Hence a solution of the tetrachlorides can be prepared much more easily in molten stannous chloride than in other common molten salts or mixtures.

A further advantage of stannous chloride arises out of the fact that it is a reducing agent and tends to maintain in the ferrous state any iron that may be present as an impurity. As described below, such iron remains dissolved in the stannous chloride and is removed therefrom in a separate step of the process.

The zirconium and hafnium tetrachlorides have a tendency to form with certain salts and salt mixtures stable addition products that either prevent fractionation entirely or limit the extent to which a separation can be made. It has been found that stannous chloride appears to be completely free from this tendency to form addition products at the proposed operating temperatures, and thus when stannous chloride is used as the solvent a complete separation can be made to produce substantially pure zirconium tetrachloride and hafnium tetrachloride.

The nature of the present invention can be more fully understood and appreciated by reference to the accompanying drawing which illustrates apparatus capable of being used to carry out the method of the invention. A specific illustrative embodiment of the present method will now be described with reference to the apparatus shown in the drawing.

Referring to the drawing, the numeral 10 generally designates a fractionating tower containing conventional packing 12 and having electric heating elements 14 extending over substantially the entire surface. The heating elements 14 are preferably arranged in sections so that different portions of the tower 10 can be heated to different temperatures. The mixture to be distilled is fed from a feed tank 16 through the feed pipe 18 to a point near the center of tower 10. The feed tank 16 and pipe 18, like most of the other equipment to be described, is provided with external electric heating elements to maintain the materials therein in fluid condition.

The feed material in tank 16 is a solution of 1 part by weight of a mixture of zirconium and hafnium tetrachlorides in 2 parts by weight of molten stannous chloride. The mixture of zirconium and hafnium tetrachlorides contains approximately 2% hafnium and 98% zirconium. Within the tower 10 the tetrachloride mixture is fractionated and the vapors comprising hafnium tetrachloride of a relatively high degree of purity leave the top of the tower through a pipe 20 which leads to a condenser 22. Within the condenser 22 the hafnium tetrachloride is condensed and falls into a container 24.

The zirconium tetrachloride in solution in the stannous chloride moves downwardly through tower 10 to a re-boiler 26 and then flows through pipe 28 to a stripping column 30. In stripping column 30 the zirconium chloride is stripped by vaporization from the stannous chloride and flows in part to the condenser 32 wherein it is condensed and collected in a container 34 and partly through pipe 36 back to the reboiler 26 and thence up into the tower 10. A shut-off valve 58 is provided near condenser 32 and a second shut-off valve 60 is provided in pipe 36 so that the proportion of zirconium tetrachloride returned to the re-boiler 26 can be regulated and also so that the tower can be operated on total reflux by shutting valve 58 and opening valve 60.

The molten stannous chloride from the stripping column 30 is pumped by a pump 38 through a pipe 40 to and through a coil 42 in re-boiler 26 wherein it gives up its heat to the solution leaving the bottom of tower 10. From the re-boiler 26 the stripped molten stannous chloride flows through a pipe 44 to an accumulator tank 46 positioned above the top of tower 10. A portion of the molten stannous chloride returning through pipe 44 is diverted into a flash chamber 48 wherein the stannous chloride is heated to a high enough temperature to vaporize it. The stannous chloride vapors are returned through pipe 50 to the accumulator tank 46. The function of flash chamber 48 is to separate non-volatile impurities e. g. iron, from the molten stannous chloride so that they do not accumulate in the system.

Molten stannous chloride from the accumulator tank 46 flows through a pipe 52 to the feed tank 16 to provide a solvent for dissolving further quantities of the hafnium tetrachloride-zirconium tetrachloride mixture. Also the accumulator tank 46 is connected by a pipe 54 containing regulating valve 56 with the top of tower 10 and a controlled amount of the molten stannous chloride is passed through pipe 54 as reflux for the tower 10. Pipe 52 contains a valve 59 for controlling the flow of molten stannous chloride therethrough.

It is evident that the system described above operates at a relatively high temperature. Thus the approximate temperatures at different points of the system are 250° to 450° C. at the top of the tower 10, 470° C. at the re-boiler 26, 600° C. in the stripping column 30, 625° C. in the flash chamber 48, and 250°–260° C. in the feed tank 16 and accumulator tank 46. Because of these high operating temperatures, it is desirable that the apparatus be fully insulated and that the principal pieces of equipment be externally heated to reduce heat losses and to maintain the solvent and solution in liquid form.

Condensation of the vapors in condensers 22 and 32 can be effected on water-cooled surfaces provided with scrapers or vibrators to remove the solid material, or alternatively the vapors can be brought into contact with a cool, inert gas to condense the vapors as a fine powder that is then allowed to settle in the collecting chambers 24 and 34, respectively.

It has been found that for the mixture of hafnium and zirconium tetrachlorides referred to above and using stannous chloride as a solvent in the manner described, a single-stage separation factor of almost 2 can be achieved. Since the separation of these two materials is normally quite difficult, the achievement of such a high separation factor is an important index of the exceptional effectiveness of the present process.

It is, of course, to be understood that the foregoing description is illustrative only and that numerous changes can be made without departing from the spirit of the invention. As has been pointed out, a large number of difficultly separable mixtures can be treated in accordance with the present process and a wide variety of solvents can be used. The method can be carried out on either a batch or continuous basis. While it is preferable to carry out the process at atmospheric pressure, pressures either above or below atmospheric pressure can be used in particular cases. Although in the specific example given above the feed to the tower 10 is in liquid form, it is evident that the feed can also be supplied in vapor form if desired. Other modifications within the scope of the invention will be apparent to those skilled in the art.

I claim:

1. The method of separating a mixture of zirconium and hafnium halides comprising the steps of establishing and maintaining an elongated fractional distillation zone, feeding to a central portion of said zone a solution of said mixture in a solvent which is molten stannous chloride, fractionally distilling said solution within said zone, removing at one end of said zone a fraction enriched with respect to said hafnium halide, removing from the other end of said zone a solution of said zirconium halide in said solvent, separating said zirconium salt from said solvent by distillation and returning at least a part of the separated solvent to said one end of said zone as reflux to provide a liquid exchange medium for the vapors of said zirconium and hafnium halides throughout said fractional distillation zone.

2. A method according to claim 1 and wherein at least a part of the returned separated solvent is distilled to separate non-volatile impurities therefrom.

3. The method of separating a mixture of zirconium and hafnium tetrahalogenides comprising the steps of establishing and maintaining an elongated fractional distillation zone, feeding to a central portion of said zone a solution of said mixture in a solvent which is molten stannous chloride, fractionally distilling said solution within said zone, removing at one end of said zone a fraction enriched with respect to hafnium tetrahalogenide, removing from the other end of said zone a solution of said zirconium tetrahalogenide in said solvent, separating said zirconium tetrahalogenide from said solvent by distillation, returning a part of said separated solvent to said one end of said zone as reflux to provide a liquid exchange medium for the vapors of said mixture throughout said distillation zone, and dissolving in the remainder of said solvent a further quantity of said mixture as feed to said zone.

References Cited in the file of this patent

UNITED STATES PATENTS

| | | |
|---|---|---|
| 1,582,860 | Van Arkel et al. | Apr. 27, 1926 |
| 1,666,440 | Coster et al. | Apr. 17, 1928 |
| 2,387,228 | Arnold | Oct. 23, 1945 |
| 2,502,327 | Krchma et al. | Mar. 28, 1950 |
| 2,626,203 | Blumenthal | Jan. 20, 1953 |

FOREIGN PATENTS

| | | |
|---|---|---|
| 266,800 | Great Britain | Feb. 28, 1927 |
| 660,397 | Great Britain | Nov. 7, 1951 |